United States Patent [19]

Umezawa

[11] 4,246,805
[45] Jan. 27, 1981

[54] DRIVE RANGE CONTROL FOR AN AUTOMATIC TRANSMISSION

[75] Inventor: Mitsuo Umezawa, Akikawashi, Japan

[73] Assignee: Fuji Heavy Industries Co., Ltd., Tokyo, Japan

[21] Appl. No.: 911,152

[22] Filed: May 31, 1978

[30] Foreign Application Priority Data

Jun. 6, 1977 [JP] Japan ................................ 52/65730

[51] Int. Cl.³ ........................................... B60K 41/04
[52] U.S. Cl. ................................................... 74/851
[58] Field of Search ......................... 74/851, 853, 866

[56] References Cited

U.S. PATENT DOCUMENTS

| 2,366,253 | 1/1945 | Griswold | 74/853 |
| 3,835,733 | 9/1974 | Wurst | 74/851 X |

FOREIGN PATENT DOCUMENTS

| 1053049 | 12/1966 | United Kingdom | 74/851 |
| 1201612 | 8/1970 | United Kingdom | 74/851 |
| 1360596 | 7/1974 | United Kingdom | 74/851 |

Primary Examiner—Nile C. Byers, Jr.
Attorney, Agent, or Firm—Birch, Stewart, Kolasch & Birch

[57] ABSTRACT

An automatic transmission with a torque converter for use with an internal combustion engine in which the ignition timing is changed over to an advancing timing region or a retarding timing region in response to the operating condition of the engine. Two different speed shifting characteristics are provided in response to whether the ignition timing is in the advancing timing region or in the retarding timing region. In addition, the two speed shifting characteristics are changed over to each other according to the two ignition timing characteristics.

5 Claims, 5 Drawing Figures

DRIVE RANGE CONTROL FOR AN AUTOMATIC TRANSMISSION

FIELD OF THE INVENTION

The present invention relates to an automatic transmission with a torque converter used in combination with an internal combustion engine of the type in which the ignition timing of the engine is automatically changed so as to be either advanced or retarded in response to change in the operating condition of the internal combustion engine, for the purpose of purifying pollutants contained in exhause emissions. More particularly, the present invention relates to an automatic transmission with means for controlling the drive range of the automatic transmission. The control means operates so as to change the speed shifting characteristic of the automatic transmission in response to change in the ignition timing of an internal combustion engine to which the automatic transmission is connected.

BACKGROUND OF THE INVENTION

It is known that when the ignition timing of an internal combustion engine is retarded with respect to the top dead center on the compression stroke of pistons, combustion speed of an air-fuel mixture taking place in the combustion chambers is reduced. As a result, although the output of the engine is lowered, pollutants contained in the exhaust emission can be reduced. On the other hand, when the ignition timing is advanced, the pollutants contained in the exhaust emission are increased and the output of the engine is increased.

Accordingly, in addition to control of the ignition timing to an optimum timing (Minimum Advance for Best Torque) depending on the engine revolution and intake manifold vacuum of an engine, there has heretofore been conducted a change-over control of the ignition timing between ignition-advance region and ignition-retard region so as to purify the exhaust gas and to enhance the engine output.

In an internal combustion engine provided with an automatic transmission, however, such a serious disadvantage that the driveability of a vehicle is degraded or reduced is brought about when the engine is operated under such a condition that the ignition timing is in the vicinity of the boundary between the ignition advance region and the retard region.

It is therefore an object of the present invention to eliminate the above-mentioned disadvantage encountered by the conventional automatic transmission used in combination with an internal combustion engine.

Another object of the present invention is to provide means for controlling the drive range operation of an automatic transmission used in combination with an internal combustion engine whereby the shifting characteristic of the automatic transmission is changed depending upon whether the ignition timing of the engine is being advanced or retarded, so that the shifting operation by drive range control elements of the automatic transmission does not take place while the engine is operated under a boundary region where the ignition timing is frequently changed from the advance region to the retard region and vice versa.

In accordance with the present invention; there is provided an automatic transmission with torque converter adapted for use with an internal combustion engine of the type having an ignition control device in which the ignition timing of the engine is changed over from an advancing timing region to a retarding timing region or vice versa in compliance with change in the operating conditions of the engine, and means for automatic shifting from one drive range to another, said control means comprising:

shift valve means for controlling an occurence of automatic speed-shifting under the control of a throttle pressure and a governor pressure applied thereto, respectively;

governor valve means for supplying said shift valve means with said governor pressure generated in response to the speed of a vehicle on which the internal combustion engine is mounted;

throttle pressure supply valve means for supplying said shift valve means with said throttle pressure generated in accordance with an application thereto of a valve actuating input signal;

means for producing two different said input signals, each being a function of a negative pressure from an engine intake manifold; and;

means for selecting an application of one of said two different valve actuating input signals from said input signal producing means to said throttle pressure supply valve means in response to whether said ignition timing is in said advancing timing region or in retarding timing region.

BRIEF DESCRIPTION OF THE DRAWINGS

The present invention will become more apparent from the ensuing description of the present invention with reference to the accompanying drawings wherein.

DETAILED DESCRIPTION OF THE INVENTION

Figure 1:
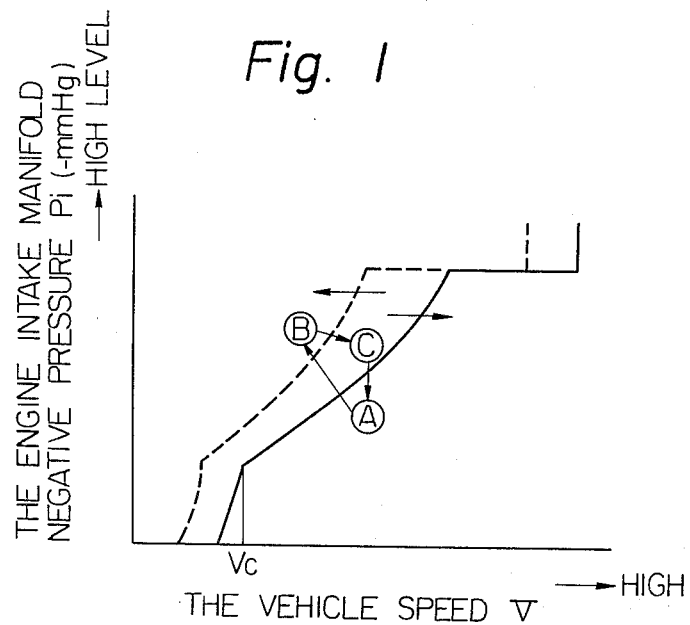
FIG. 1 is a diagram showing a transmission characteristic of a conventional automatic transmission.

Referring now to FIG. 1 illustrating the drive range characteristic of a conventional automatic transmission, for example, when a vehicle is being driven under a condition represented by a point A (the advance region) comes to a gentle slope having a relatively low gradient of a road, the load applied to the engine is increased and the vehicle speed is lowered. Hence, an accelerator must be operated. At this stage, if the vehicle is being driven at an engine speed where the ignition timing is to be changed over, an engine speed sensor is actuated in response to the reduction of the vehicle speed so as to change over the ignition timing to the ignition retard region. Accordingly, the engine output is reduced and if the accelerator pedal is considerably depressed so as to prevent reduction of the vehicle speed, a throttle pressure is elevated and the running condition is changed to, for example, the condition represented by a point B in FIG. 1. Therefore, the automatic transmission is automatic transmission is automatically shifted to the low speed gear. As a result, the engine output is increased, and accordingly, the engine speed is increased. Thus, the ignition timing is re-changed to the advance region because the engine speed sensor is actuated. Consequently, the output of the engine is further enhanced so as to accelerate the vehicle, and the running condition is shifted to, for example, the condition represented by a point C in FIG. 1. At this point, the driver feels this condition of the point C and returns the accelerator pedal so as to maintain a certain speed. As a result, an intake negative pressure is raised and the condition of the point A is restored. However, since these operations are repeated in a short period of time, hunting is caused in the operation of the vehicle and the driveability is drastically degraded or reduced. These disadvantages can be eliminated by the automatic transmission according to the present invention described hereinbelow.

Figure 2:
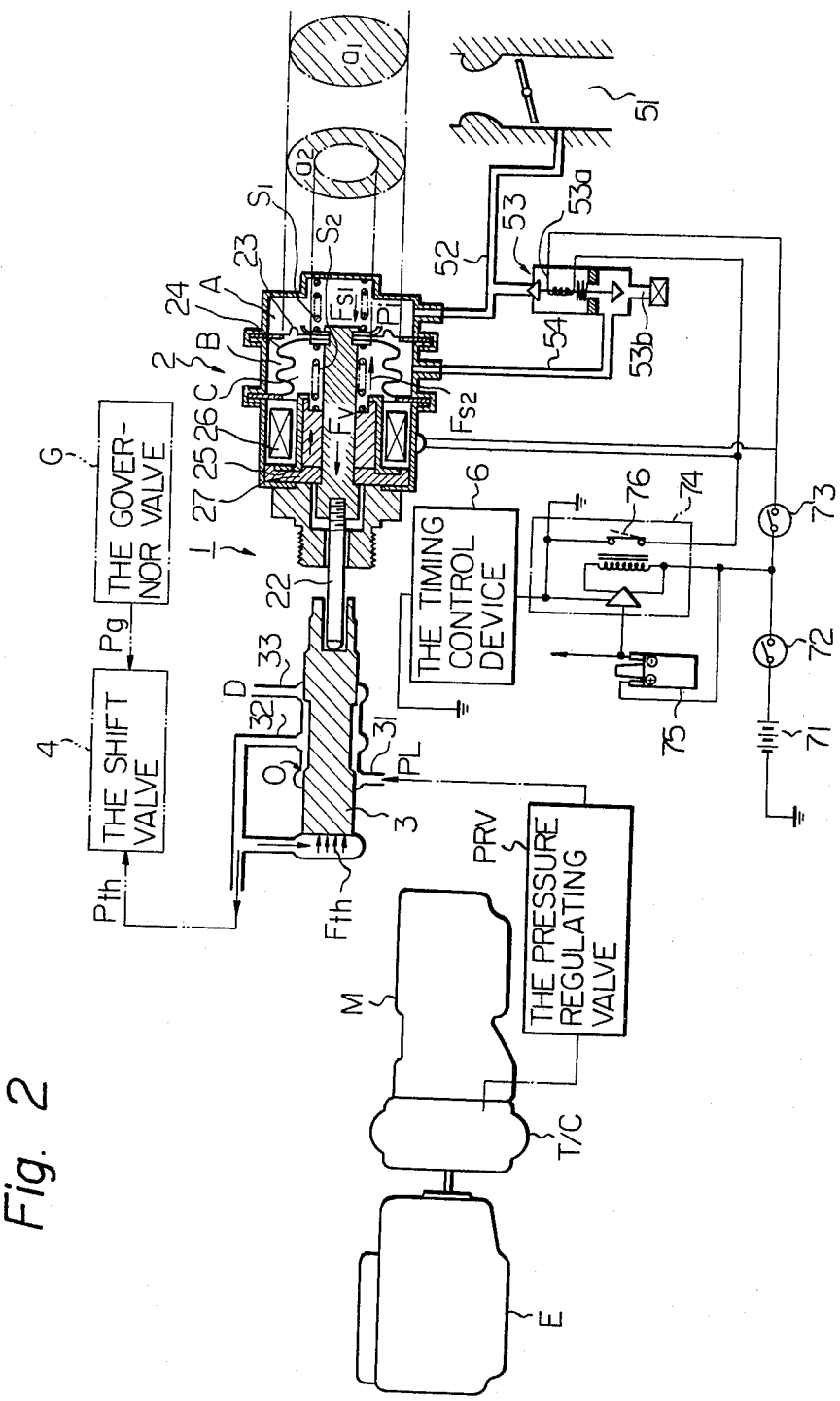
FIG. 2 is a diagrammatic view illustrating an apparatus for controlling the shifting operation of an automatic transmission, according to an embodiment of the present invention.

In FIG. 2 which shows a control apparatus of the present invention associated with a transmission unit M and a torque converter T/C driven by an engine E, reference numeral 1 represents a vacuum throttle valve, and an output rod 22 of a vacuum diaphragm 2 is connected to one end of a throttle spool valve 3 which adjusts a throttle pressure which is a hydraulic pressure signal used for controlling the operation of an automatic transmission with a torque convertor.

In an automatic transmission, the governor pressure Pg of a governor valve G which changes depending on change in a vehicle speed and a throttle pressure Pth which changes depending on change in the intake manifold vacuum of the engine E acting on opposite ends of a shift valve 4, respectively. The shift valve 4 is changed over depending on the balance between forces of these pressures to operate predetermined transmission elements, whereby the speed change operation is automatically accomplished. The spool valve 3 operates, under the control of the vacuum diaphragm 2, so as to control communicating opening areas of a line pressure passage 31, a throttle pressure passage 32 and a drain passage 33 or intercept these passages, whereby line pressure PL supplied, via a pressure regulating valve PRV, from the torque converter T/C is reduced to the throttle pressure Pth of an appropriate level.

The interior of the vacuum diaphragm 2 is divided into chambers A and B and a chamber C (air chamber) by a diaphragm 23 and bellows 24. An intake negative pressure (vacuum) Pi in an engine intake passage 51 is always introduced into the chamber A through a negative pressure passage 52. This intake negative pressure Pi is also introduced into the chamber B via a solenoid valve 53 and through a negative pressure passage 54 at a predetermined time. When the solenoid valve 53 is energized by application of electric current, the valve 53 closes a relief port 53b which is connected to the atmosphere and opens the negative pressure passage 54. When application of the electric current is stopped and the solenoid valve 53 is de-energized, the relief port 53b is communicated with the chamber B.

Both the diaphragm 23 and bellows 24 of the vacuum diaphragm 2 are connected to one end of the output rod 22, and the pressure receiving area a1 of the diaphragm 23 on the side of the chamber A is larger than the pressure receiving area a2 of the diaphragm 23 on the side of the chamber B. Diaphragm springs S1 and S2 press the diaphragm 23 under set forces Fs1 and Fs2, respectively, in opposite directions from the chambers A and C. One end of the diaphragm spring S2 on the side of the chamber C is seated on a movable iron piece 25. When an electric coil 26 is energized by application of electric current, the movable iron piece 25 is moved in a direction indicated by an arrow "T" in FIG. 2, whereby the set force Fs2 of the diaphragm spring S2 is increased. When application of the electric current is stopped and the coil 26 is de-energized, the movable iron piece 25 is moved to fall in contact with a stopper 27, whereby the set force Fs2 is reduced to zero. A differential force (Fs1−Fs2) acts as an elastic force on the diaphragm 23.

Energization and de-energization of an electric coil 53a of the solenoid valve 53 and the coil 26 of the vacuum diaphragm 2 are conducted co-operatively with an ignition timing-control device 6 provided for a vacuum-advance device of a distributor. More specifically, each of the energizing circuits of the coils 53a and 26 consists of a series circuit including a battery 71, a key switch 72, a vehicle speed switch 73, the coil 53a or coil 26 and an engine rotation sensor 74. The engine revolution sensor 74 is a switch which detects a pulse signal on the primary side of an ignition coil 75 and closes a relay switch 76 at the time of a low speed engine revolutions (for example, a rotation number lower than 2,000 r.p.m.) or opens the relay switch 76 at the time of high speed rotation. The timing control device 6 receiving a signal of the sensor 74 sets the ignition timing characteristic to the retard angle side at the time of the low speed engine rotation to effect purging of an exhaust gas, while it sets the ignition timing characteristic to the advance angle side to enhance the output at the time of the high speed rotation of an engine.

The vehicle speed switch 73 is disposed outside a signal circuit of the ignition timing-control device 6 so that the device 6 is not influenced by the switch 73, and the switch 73 is arranged so that it is deactivated (opened) when the vehicle speed is lower than a predetermined value Vc (relatively low value of about 10 to 15 Km/hr) and it is activated (closed) when the vehicle speed is higher than the predetermined value Vc. The engine rotation speed corresponding to the predetermined vehicle speed Vc is adjusted so that it is in the low speed rotation region sensed by the engine rotation sensor 74.

The operation of an automatic transmission having the above-mentioned arrangement will now be described.

In the vacuum throttle valve 1, the spool valve 3 is stopped at such a position that the throttle pressure Pth acting on the left end of the spool valve 3 so as to produce the force Fth pressing the valve 3 to the right is balanced with the force Fv of the vacuum diaphragm 2 pressing the output rod 22 to the left.

The spool valve 3 which has thus been positioned forms a variable throttle portion 0 in the communicating portion between the line pressure passage 31 and the throttle pressure passage 32. As the spool valve 3 is shifted to the right in FIG. 2 from the leftmost position, the opening area of the variable throttle portion 0 is gradually reduced and when the spool valve 3 arrives at the right end, the throttle portion 0 is completely closed. At such completely closed position, the throttle pressure passage 32 is communicated with the drain passage 33, and the throttle pressure Pth is reduced to zero. Decrease of the opening area of the variable throttle portion 0 results in reduction of the line pressure PL at the throttle portion and in reduction of the throttle pressure Pth which is a hydraulic pressure signal used for controlling the operation of an automatic transmission with a torque convertor.

The characteristic of the throttle pressure Pth controlled in the above-mentioned manner will be described hereinbelow with reference to FIG. 3.

A. Ignition-Advance Region (region of high engine speed, for example, region of engine speed higher than 2,000 r.p.m.):

The ignition is timed to occur before the piston reaches top dead center on the compression stroke by the action of the ignition timing-adjusting device 6. That is, the ignition timing is advanced and the engine output is increased. At this stage, the key switch 72 and the venicle speed switch 73 shown in FIG. 2 are activated and the engine rotation sensor 74 (FIG. 2) is deactivated. The key switch 72 is activated when the engine is in operation. However, when the engine is stopped, the key switch 72 is deactivated. The vehicle speed switch 73 operates in a manner such that when a vehicle speed is higher than Vc (Vc is approximately equal to 10 through 15 km/H) it is activated (Closed), and that when a vehicle speed is lower than Vc, it is deactivated (Opended). The engine revolution sensor 74 operates in a manner such that when the engine is operated at a high speed N (N >2000R. P. M.), a relay switch 76 is deactivated (Opened), and that when the engine is operated at a speed lower than 2000 R.P.M., the relay switch 76 is activated. The relationship between Vc and N are established so that the vehicle speed Vc is obtained from the engine whose speed is in the range of the low engine speed, that is, N °2,000 R.P.M. The above-mentioned operation of the switches 72, 73 and 74 is illustrated below.

(1). In this state, the intake negative pressure Pi is simply introduced into one chamber of the vacuum diaphragm alone and the throttle vacuum is thus controlled in the same manner as in the conventional system.

(B.) Ignition-retard Region (region of low engine speed, for example, region of engine speed lower than 2,000 r.p.m.):

(B-1) The Case Where Vehicle Speed is Higher Than A Predetermined Speed Value (for example, 15 Km/hr):

The ignition is timed to occur when the piston reaches the vicinity of top dead center on the compression stroke by the action of the ignition timing-controlling device 6. That is, the ignition timing is retarded and the output is lowered. However, contents of pollutants in an exhaust gas are reduced. At this stage, the key switch 72, the vehicle speed switch 73 and the engine rotation sensor 74 shown in FIG. 2 are activated. Therefore, the exiting circuit is closed, whereby an electric current is applied to both the coil 26 and the coil 53$a$ (FIG. 2).

Accordingly, in the solenoid valve 53 in FIG. 2, the relief port 53$b$ is blocked and both the negative pressure passage 52 and 54 are communicated with the engine intake passage 51. As a result, the intake negative pressure is introduced into both the chambers A and B of the vacuum diaphragm 2 (FIG. 2) and apply a differential force Pi (a1−a2) onto the diaphragm 23.

Further, the coil 26 upon being excited, presses the movable iron piece 25 toward the right in FIG. 2, and the set force Fs2 of the diaphragm spring S2 is increased (up to 1.1 Kg from 0 Kg in this embodiment).

Accordingly, the force Fv acting on the diaphragm

| In the specification | | engine speed N(r. p. m.) | vehicle speed V(km/h) | SW 73 | SW 76 | Coils 26,53$a$ | the force Fv= |
|---|---|---|---|---|---|---|---|
| A. Ignition-Advance Region | | N>2000r.p.m. | V>Vc (10–15km/h) | ON | OFF | No Electric Current | 3-a1 . Pi |
| B. Ignition-retard Region | B-1 | N<2000r.p.m. | | | ON | Electric Current Flows | 1.9-(a1-a2)Pi |
| | B-2 | | V<Vc (10–15km/h) | OFF | | No Electric Current | 3-a1 . Pi |

Accordingly, no electric current is applied to the electrical coils 26 and 53$a$ (FIG. 2) and they are kept in the de-energized state. Therefore, the movable iron piece 25 (FIG. 2) is located on the left end of the stroke and the set force Fs2 of the diaphragm spring S2 (FIG. 2) is reduced to zero.

The solenoid valve 53 (FIG. 2) operates so as to provide communication between the negative pressure passage 54 (FIG. 2) and the relief port 53$b$, and hence, the pressure within the chamber B of the vacuum diaphragm 2 becomes the atmospheric pressure and the intake negative pressure of the engine intake passage 51 is simultaneously introduced into the chamber A through the negative pressure passage 52.

Accordingly, the force Fv acting on the diaphragm 23 is expressed as follows:

$$Fv = (Fs1 - Fs2) - a1 \cdot Pi$$

Figure 3:
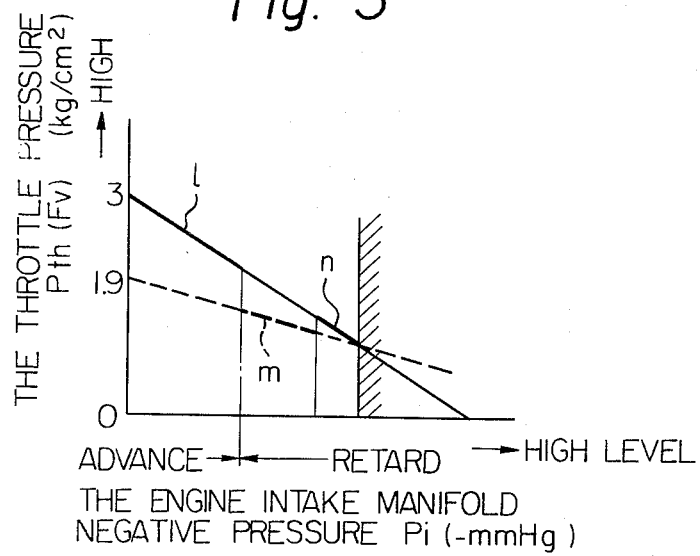
FIG. 3 is a diagram showing the characteristic of a throttle pressure Pth produced by the apparatus of FIG. 2.

Supposed that set forces Fs1 and Fs2 of the diaphragm springs are 3 Kg and 0 Kg, respectively, the force Fv is 3−a1·Pi and is expressed by a line segment 23 is 1.9−(a1−a2)Pi[=(Fs1−Fs2)−(a1−a2)Pi]and is expressed as a line segment m in FIG. 3.

(B-2) The Case Where Vehicle Speed Is Lower Than A Predetermined Speed Value Vc:

The vehicle speed switch 73 is deactivated, and the coils 26 and 53$a$ are de-energized. Therefore, the throttle pressure characteristic becomes the same as that of the ignition-retard region mentioned in A above and the force Fv expressed as a line segment n in FIG. 3.

As pointed out hereinbefore, the throttle pressure Pth is controlled by displacement of the spool valve 3 so that it is balanced with the force Fv acting on the diaphragm 23. Accordingly, it should be understood that in FIG. 3, even if the force Fv indicated by the ordinate is replaced with the throttle pressure Pth, the same characteristic is manifested. Thus, it will be understood that the diagram of FIG. 3 indicates the characteristic of the throttle pressure Pth with respect to the intake negative pressure Pi as well as the characteristic of the force Fv with respect to the intake negative pressure Pi.

Figure 4:
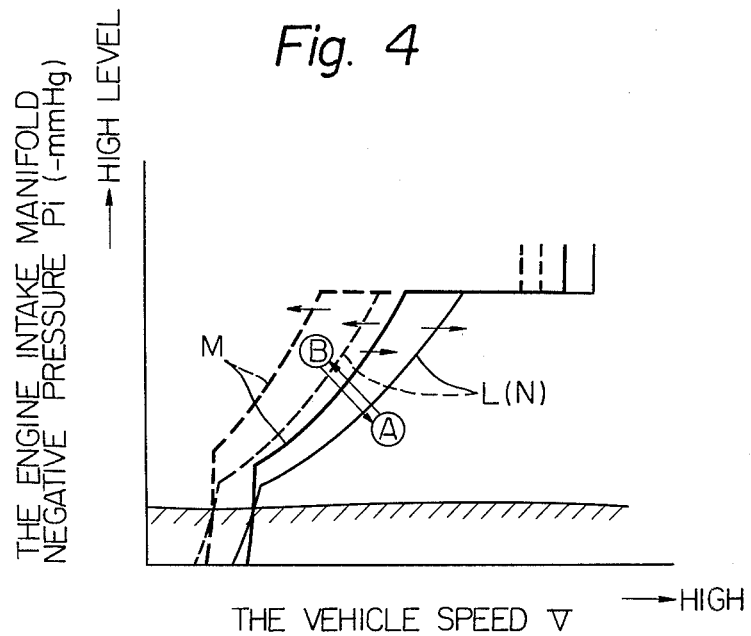
FIG. 4 is a diagram showing the transmission characteristics of an automatic transmission controlled by the apparatus of FIG. 2.

The above-mentioned throttle pressure Pth and the governor pressure Pg which is related to the vehicle speed act on the shift valve 4. Therefore, the speed-shift characteristic as shown in FIG. 4 is exhibited. More specifically, the shifting characteristic M in the region where the ignition timing is on the retard side and the vehicle speed is higher than the predetermined vehicle speed Vc is shifted to the lower vehicle speed side than the speed change characteristic L (or N) in the other region (1 or n in FIG. 3) (namely, the same characteristic as in the conventional system).

Accordingly, in the present invention, when the vehicle running in the state corresponding to the point A in FIG. 4 in which the ignition timing is included in the advance region but is in the vicinity of the boundary between the ignition-advance side and the ignition-retard side comes on a gentle slope and the load is increased and the vehicle speed is lowered, and when the engine rotation sensor 74 is hence actuated to shift the ignition timing to the region of the ignition-retard side and the engine output is reduced, even if the accelerator is greatly depressed to prevent of reduction of the speed or output and the running state is shifted to the state corresponding to the point B by increase of the throttle pressure Pth, the speed-shift characteristic in the ignition-retard region at a speed higher than the predetermined speed value Vc is expressed by M in FIG. 4 and is on the low vehicle speed side, and therefore, shifting to the low speed stage is not caused. Accordingly, the subsequent driving operation can be performed smoothly without occurence of an undesirable phenomenon such as hunting.

Referring again to FIG. 3, it will be understood that in the case where the vehicle speed is lower than the predetermined value Vc, the characteristic of the throttle pressure Pth in the region of the ignition-retard side, which is indicated by the line section (n), is made equal to that of the throttle pressure Pth in the region of the ignition-advance side, which is indicated by the line section (L). This is because since the throttle pressure Pth becomes relatively lowered in the region of the ignition-retard side and since the line pressure PL is accordingly lowered, the above arrangement of the throttle pressure characteristic is needed so as to prevent occurrence of such an undesirable phenomenon that slip is caused among respective shifting elements of the automatic transmission (from lack of the operating pressure acting on each element) especially in the low vehicle speed region.

As pointed out hereinbefore, the throttle pressure Pth is acquired from controlling the line pressure PL by means of the spool valve 3. However, it should be understood that the line pressure PL is always corrected by a pressure regulating valve (not shown in FIG. 2) in response to change in the magnitude of the throttle pressure Pth.

Even if such arrangement is made, since the low vehicle speed region is greatly deviated from the boundary between the ignition-advance side and ignition-retard side of the ignition timing, the main effect of the present invention is not greatly degraded or reduced.

In the foregoing embodiment, changing of the speed shifting characteristic to the low vehicle speed side is accomplished by exciting the coil 26 and introducing a negative pressure into the chamber B of the vacuum diaphragm 2, but introduction of the negative pressure into the chamber B may be omitted. Namely, provision of the chamber B may be omitted. In this case, the throttle pressure characteristic is arranged as shown in FIG. 5.

Figure 5:
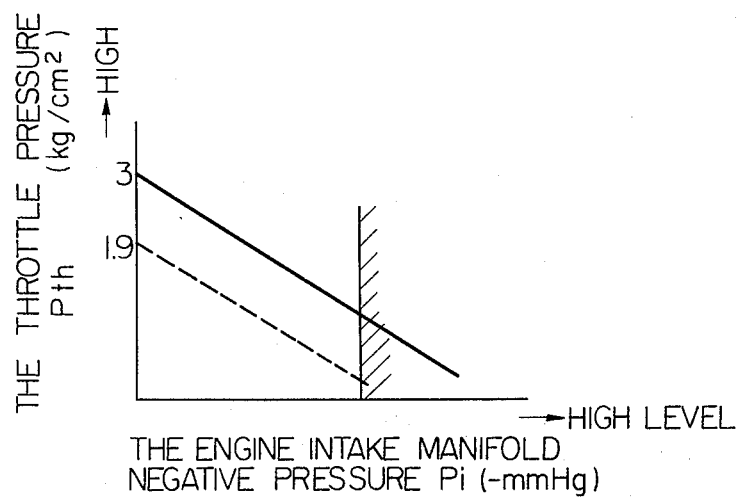
FIG. 5 is a diagram showing the characteristics of a throttle pressure Pth produced by an apparatus according to another embodiment of the present invention.

According to this embodiment of FIG. 5, excessive line pressure PL by reduction of the engine output can be prevented by not only the above arrangement of the speed shifting characteristic but also reduction of the line pressure PL on the ignition-retard side of the ignition timing. Accordingly, attainment of secondary effects such as prevention of shocks at the time of shifting the speed and reduction of the damage on an oil pump is expected.

From the foregoing illustration of the present invention, it will be understood that even in a boundary region where the ignition timing of an engine is changed over from the ignition-advance side to the ignition-retard side or vice versa and where the engine output is varied, the speed shifting characteristic of the automatic transmission is selected so that no automatic speed shifting occurs in such boundary region. Consequently, in the automatic transmission of the present invention, no needless automatic speed shifting is conducted and the driveability of a vehicle is improved.

What is claimed is:

1. An automatic transmission with torque converter adapted for use with an internal combustion engine having an ignition control device in which the ignition timing of the engine is changed over from an advancing timing region to a retarding timing region or vice versa in compliance with change in the operating condition of the engine, and control means for controlling automatic shifting from one speed to another, said control means comprising:

shift valve means being operatively responsive to a throttle valve means and a governor valve means to operate predetermined transmission elements for controlling an occurrence of an automatic speed-shifting under the control of a throttle pressure generated by said throttle valve and a governor pressure generated by said governor valve applied thereto, respectively;

said governor valve means being operatively connected to said shift valve means for supplying said shift valve means with said governor pressure generated in response to the speed of a vehicle on which the internal combustion engine is mounted;

said throttle valve means being operatively connected to said shift valve means for supplying said shift valve means with said throttle pressure generated in accordance with an application thereto of a valve actuating input signal;

input signal producing means operatively related to said engine for producing two different said valve actuating input signal, each being a function of a negative pressure from an engine intake manifold, and;

selecting means operatively related to said input signal producing means for selecting an application of one of said two different valve actuating input signals from said input signal producing means to said throttle pressure supply valve means in response to whether said ignition timing is in said advancing timing region or in said retarding timing region for purifying pollutants in exhaust emissions of the engine.

2. An automatic transmission as set forth in claim 1, wherein said throttle pressure supply valve means comprises a movable spool valve to convert a line pressure to said throttle pressure, and wherein said input signal producing means comprises an output rod having one end associated with said movable spool valve and the other end connected to a diaphragm having two pressure receiving surfaces of relatively smaller and larger areas, spring means operatively arranged adjacent to said diaphragm, said spring means having a first and a second position to apply a first and a second predetermined spring force to said diaphragm, respectively, electro-magnetic means for moving said spring means to one of said first and second positions and, means for applying said negative pressure from said engine intake manifold to one or both of said pressure receiving surfaces of said diaphragm.

3. An automatic transmission as set forth in claim 2, wherein said negative pressure applying means comprises: a first negative pressure passage connecting between said engine intake manifold and one of said two pressure receiving surface of said diaphragm; a second negative pressure passage arranged between said engine intake manifold and the other of said two pressure receiving surfaces of said diaphragm, and; a solenoid valve disposed in a part of said second negative pressure passage to selectively block said second negative pressure passage 4. An automatic transmission as set forth in claim 3, wherein said selecting means comprises an electric circuit means including in operative relationship relative to each other: a vehicle speed sensing switch for sensing a predetermined vehicle speed; an engine speed sensor for sensing a predetermined engine speed, and; an ignition timing adjusting device for setting said ignition timing of said engine to one of said advancing timing region and said retarding timing region in response to sensing of said predetermined engine speed by said engine speed sensor.

5. An automatic transmission as set forth in claim 4, wherein said electrical circuit means being operatively connected to said electro-magnetic means of said input signal producing means and said solenoid valve of said negative pressure applying means.

* * * * *